Dec. 5, 1939. K. MAEKAWA 2,182,297

PARALLEL ELECTRIC POWER TRANSMISSION SYSTEM

Filed Sept. 16, 1937

INVENTOR.
Koichiro Maekawa
BY Samuel Scrivener Jr.
ATTORNEY

Patented Dec. 5, 1939

2,182,297

UNITED STATES PATENT OFFICE 2,182,297

PARALLEL ELECTRIC POWER TRANSMISSION SYSTEM

Koichiro Maekawa, Tokyo, Japan, assignor to Tokyo Shibaura Denki Kabushiki Kaisha, Tokyo, Japan Application September 16, 1937, Serial No. 164,261
In Japan September 21, 1936

6 Claims. (Cl. 171—97)

The present invention relates to improvements in a parallel electric power transmission system and, more particularly, to an arc suppressing system for grounding and other short-circuiting faults, and its object is to obviate the necessity of a large reactor in such parallel transmission lines and to replace it with a reactor of small capacity through which the current does not normally pass.

In parallel electric power transmission lines the amount of compensating inductive reactance for increasing the impedance of the second component circuit of symmetrical sequence circuits varies according to the line voltage and the distance of transmission. If both the line voltage and the power transmitting distance increase, the compensating inductive reactance decreases and vice versa. Since the necessary compensating inductive reactance varies with circuit conditions such as the opening or closing of circuits, the amount of inductive reactance of a reactor connected to the transmission line is preferably adjustable.

Figure 1:
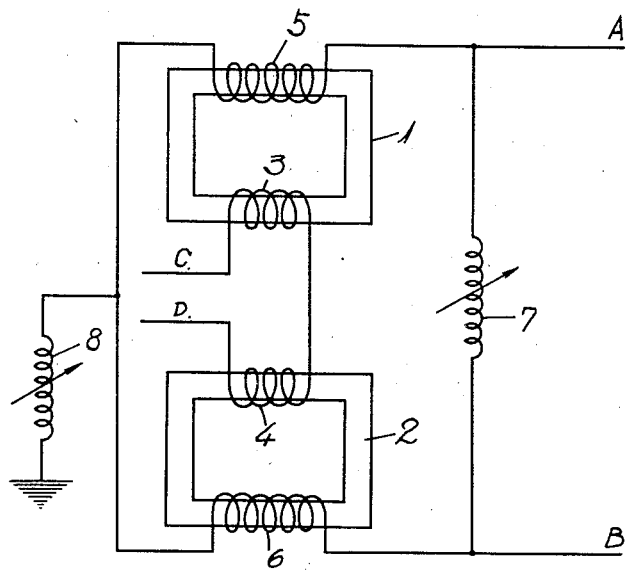
Figure 2:
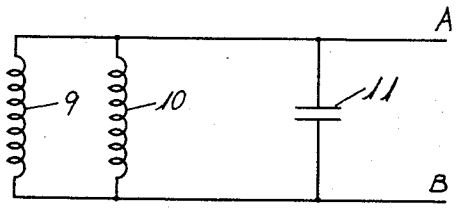

For a better understanding of my invention, reference may be had to the accompanying drawing, in which Fig. 1 is a circuit diagram of one phase of a polyphase parallel transmitting system and illustrating an embodiment of this invention; and Fig. 2 is a circuit diagram of the second component circuit of the symmetrical sequence circuits of Fig. 1.

In accordance with this invention the resultant value of the self-impedance of the main transformer winding and the inductive reactance of the inductance coil connected across the parallel transmission lines is determined to establish a resonance circuit with the static capacity of the parallel transmission circuits, including other static capacities or the like connected thereto, at the fundamental frequency of the transmission lines, thereby increasing the impedance of the second component circuit of symmetrical sequence circuits of the parallel transmission lines. With such an arrangement the said inductance coil normally carries no current so that it is required to have only a small current carrying capacity. Further, the regulating mechanism of the inductive reactance may be made very compact.

Referring to Fig. 1, A and B represent two parallel transmission circuits, to which the high voltage secondary windings 5, 6 of main transformers 1 and 2 are respectively connected. The low voltage primary windings 3, 4 of the transformer are respectively connected to feeder lines C and D.

In this invention an adjustable inductance 7 is connected between the transmission lines A and B and an adjustable inductance 8 is connected to the neutral point of the system for increasing the impedance of the zero phase component circuit of symmetrical sequence circuits. Fig. 2 illustrates diagrammatically the second component circuit of symmetrical sequence circuits corresponding to the transmission lines shown in Fig. 1, wherein 9 represents the self-inductance of the high voltage windings of the main transformers and 10 represents the inductive reactance of the inductance coil. The resultant of impedances 9 and 10 is taken as the required compensating inductive reactance, to establish a substantially tuned circuit with the static capacity 11 of the transmission lines A and B and other static capacities which may be connected thereto.

In the above-described embodiment of the invention the amount of self-impedance of the main transformer windings is taken into consideration in determining the amount of required compensating inductive reactance. However, if desired, the self-impedance of the transformer windings may be chosen as almost infinity and the inductance 7 only is assigned for the required inductive reactance and vice versa or the self-impedance of the main transformer winding is assigned for a greater part of the required inductive reactance and the resultant inductive reactance may be brought to the required value by adjusting the tap of the inductance coil 7 in accordance with the change of circuit conditions such as switching the transmission lines in or out.

It will be apparent to those skilled in the art that in place of two single phase transformers 1 and 2 as disclosed in Figure 1, one three-legged transformer may be provided, one or more low tension coil or coils being wound on one leg and high tension coils on other legs.

It will be apparent to those skilled in the art that the adjustable inductance coil 8 connected to the neutral point of the transmission system for increasing the impedance of the zero phase symmetrical first circuit as in the above mentioned example may be omitted if desired.

While I have shown one embodiment of my invention, it will be understood, of course, that I do not wish to be limited thereto since many modifications may be made and I, therefore, contemplate by the appended claims to cover any such modifications as fall within the true spirit and scope of my invention.

I claim:

1. In an electric power transmitting system, the combination of transformer means, parallel transmission lines connected to the terminals of the high tension coils of the said transformer means, and inductive means connected across the said parallel transmission lines.

2. In an electric power transmitting system, the combination of transformer means, parallel transmission lines connected to the terminals of the high tension coils of the said transformer means, and inductive means connected across the said parallel transmission lines and having sufficient value of inductive reactance that the resultant impedance, including the self-impedance of said transformer means is resonant or substantially resonant with the static capacity of the said parallel transmission lines, including other static capacities or the like connected thereto, at the fundamental frequency of the transmission lines, thereby increasing the impedance of the second component circuit of symmetrical sequence circuits of said parallel transmission lines.

3. In an electric power transmitting system, the combination of one or a plurality of main transformers, parallel transmission lines connected to the terminals of the high tension coils of the said main transformer or transformers, and inductance means connected across the said parallel transmission lines and having sufficient value of inductive reactance to effect resonance or substantial resonance with the static capacity of the said parallel transmission lines, including other static capacities connected thereto, at the fundamental frequency of the transmission lines, thereby increasing the impedance of the second component circuit of symmetrical sequence circuits of said parallel transmission lines.

4. In an electric power transmitting system, the combination of one or a plurality of main transformers, and parallel transmission lines connected to the terminals of the high tension coils of the said transformer or transformers, the self-impedance of said transformer or transformers being resonant or substantially resonant with the static capacity of the said parallel transmission lines including other static capacities connected thereto, at the fundamental frequency of the transmission lines, thereby increasing the impedance of the second component circuit of symmetrical sequence circuits of said parallel transmission lines.

5. In an electric power transmitting system, the combination of transformer means, parallel transmission lines connected to the terminals of the high tension coils of the said transformer means, inductive means connected across the said parallel transmission lines, and means connected and adapted to so adjust the value of inductive reactance that the resultant impedance, including self-impedance of said main transformers, may always tune or substantially tune with the static capacity of the said parallel transmission lines, including other static capacities connected thereto, at the fundamental frequency of the transmitting system, thereby increasing the impedance of the second component circuit of symmetrical sequence circuits of said parallel transmission lines.

6. In electric power transmission system, the combination of transformer means, parallel transmission lines connected to the terminals of the high tension coils of the said transformer means, inductive means connected across the said parallel transmission lines, and means for so adjusting the value of inductive reactance that the resultant impedance, including self-impedance of said main transformer means, is always resonant or substantially resonant with the static capacity of the said parallel transmission lines, including other static capacities connected thereto, at the fundamental frequency of the transmission lines in spite of variation of the circuit conditions of the transmitting system, thereby increasing the impedance of the second component circuit of symmetrical sequence circuits of said parallel transmission lines.

KOICHIRO MAEKAWA.